US012601840B2

(12) United States Patent
Jeong et al.

(10) Patent No.: US 12,601,840 B2
(45) Date of Patent: Apr. 14, 2026

(54) TUNING PARAMETER DETERMINATION METHOD FOR TRACKING AN OBJECT, A GROUP DENSITY-BASED CLUSTERING METHOD, AN OBJECT TRACKING METHOD, AND AN OBJECT TRACKING APPARATUS USING A LIDAR SENSOR

(71) Applicants:HYUNDAI MOTOR COMPANY, Seoul (KR); KIA CORPORATION, Seoul (KR)

(72) Inventors: Mu Gwan Jeong, Seoul (KR); Nam Gyun Kim, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 1287 days.

(21) Appl. No.: 17/396,379

(22) Filed: Aug. 6, 2021

(65) Prior Publication Data

US 2022/0179081 A1    Jun. 9, 2022

(30) Foreign Application Priority Data

Dec. 3, 2020    (KR) ........................ 10-2020-0167533

(51) Int. Cl.

| | |
|---|---|
| *G06F 18/22* | (2023.01) |
| *G01S 7/48* | (2006.01) |
| *G01S 7/486* | (2020.01) |
| *G01S 17/66* | (2006.01) |
| *G06F 18/23* | (2023.01) |
| *G06V 10/98* | (2022.01) |

(52) U.S. Cl.
CPC ............ *G01S 17/66* (2013.01); *G01S 7/4808* (2013.01); *G01S 7/486* (2013.01); *G06F 18/22* (2023.01); *G06F 18/23* (2023.01); *G06V 10/98* (2022.01)

(58) Field of Classification Search
CPC ...... G06V 20/58; G06V 10/762; G06V 10/98; G06F 18/24; G06F 18/23; G06F 18/22; G01S 17/66; G01S 7/4808; G01S 7/486; G01S 7/4802; G01S 17/89; G01S 17/931; G01S 7/4861; G01S 7/497; G06T 7/11
See application file for complete search history.

(56) References Cited

U.S. PATENT DOCUMENTS

| | | | | |
|---|---|---|---|---|
| 10,721,254 | B2 * | 7/2020 | Kotinas | ................ G06V 10/764 |
| 2018/0232583 | A1 * | 8/2018 | Wang | ..................... G06V 10/82 |
| 2020/0401817 | A1 * | 12/2020 | Schroeter | ................. G06T 7/50 |
| 2021/0048530 | A1 * | 2/2021 | Che | ......................... G06T 7/136 |

(Continued)

OTHER PUBLICATIONS

Office Action cited in corresponding Korean patent application No. KR 10-2020-0167533; Aug. 20, 2025; 10 pp.

(Continued)

*Primary Examiner* — Andrew M Moyer
*Assistant Examiner* — Ahmed A Nasher
(74) *Attorney, Agent, or Firm* — Lempia Summerfield Katz LLC

(57) ABSTRACT

An object-tracking apparatus using a LiDAR sensor of an embodiment includes: a LiDAR sensor configured to acquire a point cloud related to an object; a first clustering unit configured to primarily cluster the point cloud; and a second clustering unit configured to secondarily cluster the result of primary clustering in response to the time taken to perform primary clustering.

8 Claims, 15 Drawing Sheets

(56)  References Cited

U.S. PATENT DOCUMENTS

| 2022/0043152 A1* | 2/2022 | Li | ........................... G01S 17/66 |
| 2022/0161817 A1* | 5/2022 | Anastassov | ........ G01C 21/3841 |
| 2023/0236038 A1* | 7/2023 | Hayashi | ............. G01C 21/3811 |
| | | | 701/300 |

OTHER PUBLICATIONS

You Li et al., InsClustering: Instantly Clustering LiDAR Range Measures for Autonomous Vehicle, arXiv:2010.06681; Oct. 13, 2020; 6 pp.

\* cited by examiner

RP
GP

UGP

TUNING PARAMETER DETERMINATION METHOD FOR TRACKING AN OBJECT, A GROUP DENSITY-BASED CLUSTERING METHOD, AN OBJECT TRACKING METHOD, AND AN OBJECT TRACKING APPARATUS USING A LIDAR SENSOR

This application claims the benefit of priority to Korean Patent Application No. 10-2020-0167533, filed on Dec. 3, 2020, which is hereby incorporated by reference as if fully set forth herein.

BACKGROUND

Field of the Disclosure

The present disclosure relates to a tuning parameter determination method for tracking an object, a group density-based clustering method, an object-tracking method, and an object-tracking apparatus using a LiDAR sensor.

Discussion of the Related Art

Various technologies for realizing autonomous driving of vehicles have been developed. For example, information about a target vehicle may be acquired using a light detection and ranging (LiDAR) sensor, and an autonomous driving function of vehicles may be assisted based on the acquired information. However, there is a problem in that the accuracy of a cluster, which is formed by clustering a point cloud acquired through a LiDAR sensor, is deteriorated. Therefore, research for solving this problem is underway.

SUMMARY

Accordingly, the present disclosure is directed to a tuning parameter determination method for tracking an object, a group density-based clustering method, an object-tracking method, and an object-tracking apparatus using a LiDAR sensor that substantially obviate one or more problems due to limitations and disadvantages of the related art.

The present disclosure provides a tuning parameter determination method for tracking an object, a group density-based clustering method, an object-tracking method, and an object-tracking apparatus using a LiDAR sensor.

However, the objects to be accomplished by the embodiments are not limited to the above-mentioned objects. Other objects not mentioned herein should be clearly understood by those having ordinary skill in the art from the following description.

According to an embodiment, a method of determining a tuning parameter used to perform clustering on a point cloud acquired from an object using a LiDAR sensor to track the object may include: determining an initial value of the tuning parameter; storing a misrecognition situation of clustering in a database; detecting a tuning parameter for avoiding the misrecognition situation with referring to the database; post-processing the detected tuning parameter; and determining the post-processed tuning parameter.

A group density-based clustering method for object tracking using a LiDAR sensor according to another embodiment may include converting a point cloud related to an object into a group cloud and performing density-based clustering on the group cloud.

For example, each unit group of the group cloud may correspond to a set of points that are present in unit space defined by a user, and the coordinates of each unit group may correspond to an average value of the coordinates of a plurality of points included in the set of points.

For example, the performing density-based clustering may include: counting the number of unit groups present within the radius of a tuning parameter based on a reference group among a plurality of unit groups included in the group cloud; determining the reference group to be a core group when the counted number is greater than or equal to a first predetermined number; and performing clustering based on the determined core group.

For example, the tuning parameter may be obtained through a two-dimensional look-up table configured by accumulating data in a false-negative manner.

For example, the performing density-based clustering may further include determining the tuning parameter for each two-dimensional region of interest in consideration of a misrecognition situation of clustering. The determining the tuning parameter may include: determining an initial value of the tuning parameter; storing a misrecognition situation of clustering in a database; detecting the tuning parameter for avoiding the misrecognition situation with referring to the database; post-processing the detected tuning parameter; and determining the post-processed tuning parameter.

An object-tracking method using a LiDAR sensor according to still another embodiment may include: acquiring a point cloud related to an object; performing primary clustering on the point cloud; and performing secondary clustering on the result of primary clustering depending on the time taken to perform primary clustering.

For example, the performing primary clustering may include: performing grid-based clustering on the point cloud when the area of the region of the point cloud is greater than a first threshold area; checking whether the area of the region of the point cloud is greater than a second threshold area that is less than the first threshold area when the area of the region of the point cloud is not greater than the first threshold area; performing density-based clustering on points of the point cloud when the area of the region of the point cloud is greater than the second threshold area; and performing group density-based clustering on the points of the point cloud when the area of the region of the point cloud is not greater than the second threshold area.

For example, the object-tracking method may further include measuring the time taken for primary clustering, and secondary clustering may be performed depending on the measured time.

For example, the performing secondary clustering may include: checking whether the measured time is greater than a first threshold time; checking whether the number of target clusters obtained during primary clustering is greater than a second predetermined number when the measured time is not greater than the first threshold time; performing grid-based clustering on the points that have undergone primary clustering when the number of the target clusters is greater than the second predetermined number; checking whether the measured time is less than a second threshold time when the number of the target clusters is not greater than the second predetermined number; performing density-based clustering on the points that have undergone primary clustering when the measured time is less than the second threshold time; and performing group density-based clustering on the points that have undergone primary clustering when the measured time is not less than the second threshold time.

For example, the object-tracking method may further include checking whether there is a cluster in which the number of points is not greater than a third predetermined number among the clusters that have undergone primary clustering or secondary clustering. The method may further include removing a cluster in which the number of points is not greater than the third predetermined number among the clusters that have undergone primary clustering or secondary clustering and a cluster in which the number of points is greater than the third predetermined number and in which a similarity with a target cluster is outside of a predetermined range among the clusters that have undergone primary clustering or secondary clustering.

An object-tracking apparatus using a LiDAR sensor according to still another embodiment may include: a LiDAR sensor configured to acquire a point cloud related to an object; a first clustering unit configured to primarily cluster the point cloud; and a second clustering unit configured to secondarily cluster the result of primary clustering in response to the time taken to perform primary clustering.

For example, the first clustering unit may include: a first comparison unit configured to compare the area of the region of the point cloud with a first threshold area; a first grid-based clustering unit configured to perform grid-based clustering on the point cloud in response to the result of comparison by the first comparison unit; a second comparison unit configured to compare the area of the region of the point cloud with a second threshold area that is less than the first threshold area in response to the result of comparison by the first comparison unit; a first density-based clustering unit configured to perform density-based clustering on the points of the point cloud in response to the result of comparison by the second comparison unit; and a first group density-based clustering unit configured to perform group density-based clustering on the points of the point cloud in response to the result of comparison by the second comparison unit.

For example, the object-tracking apparatus may further include a time measurement unit configured to measure the time taken to primarily cluster the point cloud.

For example, the second clustering unit may include: a third comparison unit configured to compare the measured time with a first threshold time; a fourth comparison unit configured to compare the number of target clusters obtained by the first clustering unit with a second predetermined number in response to the result of comparison by the third comparison unit; a second grid-based clustering unit configured to perform grid-based clustering on the points clustered by the first clustering unit in response to the result of comparison by the fourth comparison unit; a fifth comparison unit configured to compare the measured time with a second threshold time in response to the result of comparison by the fourth comparison unit; a second density-based clustering unit configured to perform density-based clustering on the points clustered by the first clustering unit in response to the result of comparison by the fifth comparison unit; and a second group density-based clustering unit configured to perform group density-based clustering on the points clustered by the first clustering unit in response to the result of comparison by the fifth comparison unit.

For example, the object-tracking apparatus may further include: a sixth comparison unit configured to compare the number of points included in each of clusters clustered by the first clustering unit or the second clustering unit with a third predetermined number; a similarity-checking unit configured to check similarity between a cluster in which the number of points is greater than the third predetermined number among the primarily or secondarily clustered clusters and a target cluster; and a cluster-removing unit configured to remove a cluster in which the similarity is outside of a predetermined range or a cluster in which the number of points is not greater than the third predetermined number in response to the result of comparison by the sixth comparison unit or the result of checking by the similarity-checking unit.

BRIEF DESCRIPTION OF THE DRAWINGS

Arrangements and embodiments are described in detail with reference to the following drawings, in which like reference numerals refer to like elements and wherein.

DETAILED DESCRIPTION OF THE INVENTION

The present disclosure is now described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure is more thorough and complete, and more fully conveys the scope of the disclosure to those having ordinary skill in the art.

It should be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements. When a component, device, element, or the like of the present disclosure is described as having a purpose or performing an operation, function, or the like, the component, device, or element should be considered herein as being "configured to" meet that purpose or to perform that operation or function. The present disclosure describes various components of an object tracking apparatus as units, such as: a pre-processing unit; a grid-based and density-based clustering units; a shape analysis unit; an object tracking unit; a tracking and classification unit; an object detecting unit; comparison units; a time measurement unit; a similarity checking unit; and a cluster removing unit. Each of these units may separately embody or be included with a processor and a memory, such as a non-transitory computer readable media, as part of the apparatus.

Hereinafter, an object-tracking apparatus 10 according to an embodiment is described with reference to the accompanying drawings.

Figure 1:
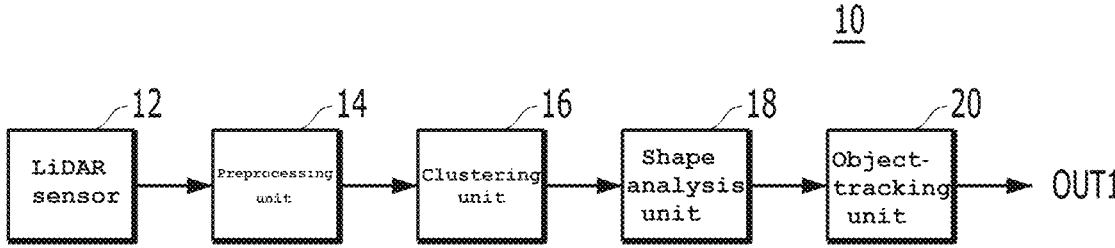
FIG. 1 is a schematic block diagram of an object-tracking apparatus according to an embodiment.

FIG. 1 is a schematic block diagram of an object-tracking apparatus 10 according to an embodiment.

The object-tracking apparatus 10 may include a light detection and ranging (LiDAR) sensor 12, a preprocessing unit 14, a clustering unit 16, a shape analysis unit (or a segment unit) 18, and an object-tracking unit (a tracking unit, a tracking and classification unit, or an object-detecting unit) 20.

The LiDAR sensor 12 obtains a point cloud related to an object. For example, the LiDAR sensor 12 may radiate a single circular laser pulse having a wavelength of 905 nm to 1550 nm to an object present within a measurement range and may measure the time taken for the laser pulse reflected from the object to return. Thus, LiDAR sensor 12 may sense information about the object, for example, the distance from the LiDAR sensor 12 to the object, the orientation of the object, the speed of the object, the temperature of the object, the material distribution of the object, and the concentration characteristics of the object. Here, the object may be, for example, another vehicle, a person, or an obstacle present outside the vehicle in which the LiDAR sensor 12 is mounted (hereinafter referred to as a "host vehicle"). However, the embodiments are not limited to any specific type of object.

The preprocessing unit 14 may remove data related to reflection from the body of the host vehicle. In other words, since there is a region that is shielded by the body of the host vehicle depending on the mounting position and the field of view of the LiDAR sensor 12, the preprocessing unit 14 may remove data related to reflection from the body of the host vehicle using a reference coordinate system.

The preprocessing unit 14 may be omitted from the object-tracking apparatus 10 according to the embodiment.

The clustering unit 16 groups the point cloud, which is the LiDAR data composed of a plurality of points related to the object acquired through the LiDAR sensor 12, into meaningful units according to a predetermined criterion. If the preprocessing unit 14 is not omitted, the clustering unit 16 may group the LiDAR data preprocessed by the preprocessing unit 14. For example, the clustering unit 16 may group the point cloud by applying vehicle modeling or guardrail modeling thereto to perform clustering to generate the contour of the object. The result of sensing by the LiDAR sensor 12 shows a plurality of points, each of which has only information about a location (or coordinates). Therefore, the clustering unit 16 serves to group the plurality of points sensed by the LiDAR sensor 12 into units having meaningful shapes.

The shape analysis unit 18 generates information about a plurality of segment boxes for each channel using the result of clustering by the clustering unit 16. Here, the segment box may be the result of converting the result of clustering into a geometric box shape. In addition, the information about the segment box may be at least one of the width, length, position, or direction (or heading) of the segment box.

The object-tracking unit 20 may track the object, the shape of which has been analyzed, to determine whether the object is an obstacle, a vehicle, or a person, and may recognize the same.

Hereinafter, a method 50 according to an embodiment for determining tuning parameters used for clustering in the object-tracking method and apparatus using the LiDAR sensor 12 is described with reference to the accompanying drawings. For better understanding, the tuning parameter determination method 50 according to the embodiment is described as being performed by the object-tracking apparatus 10 shown in FIG. 1, but the embodiment is not limited thereto. In other words, the tuning parameter determination method 50 according to the embodiment may also be performed by an apparatus configured differently from the object-tracking apparatus 10 shown in FIG. 1.

Figure 2:
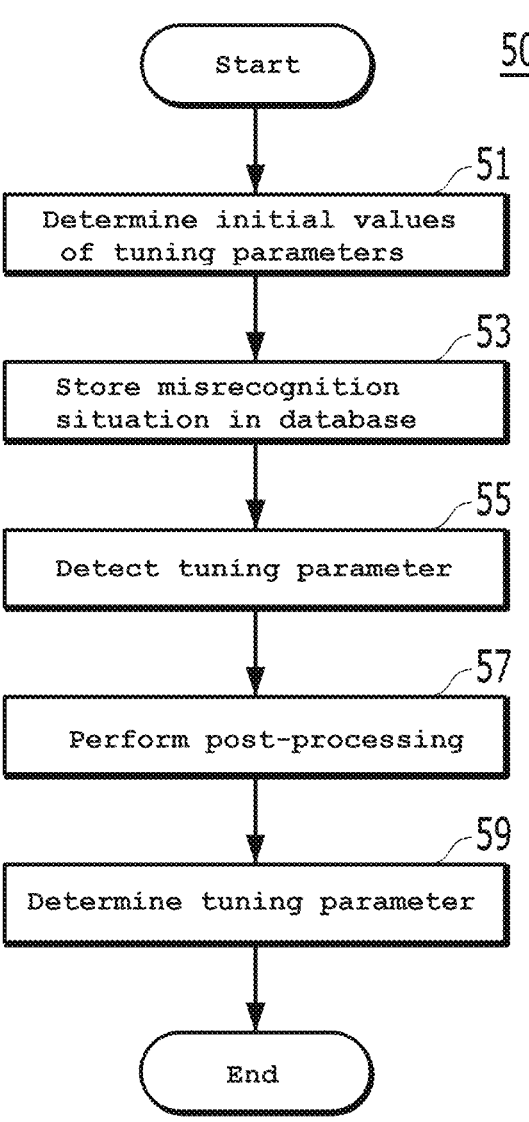
FIG. 2 is a flowchart of a tuning parameter determination method according to an embodiment.

FIG. 2 is a flowchart of the tuning parameter determination method 50 according to the embodiment.

The clustering unit 16 shown in FIG. 1 may cluster a point cloud in various ways. As examples of the clustering method, there are a grid-based clustering method and a density-based clustering (DB scan) method. As examples of the grid-based clustering method, there are a square grid-based clustering method, a rectangular grid-based clustering method, and a cylindrical grid-based clustering method.

The density-based clustering method uses tuning parameters when clustering a point cloud related to an object acquired by the LiDAR sensor 12. A method of clustering a point cloud using the tuning parameters is described later in detail with reference to FIGS. 6, 8 and 13.

Figure 3A:
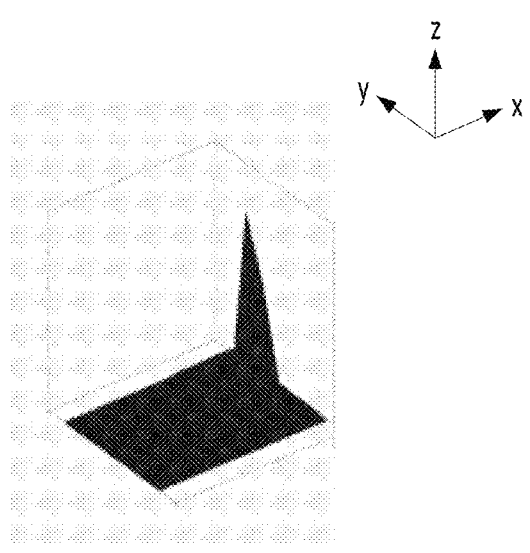
FIGS. 3A and 3B are diagrams for explaining step 51 shown in FIG. 2.
Figure 3B:
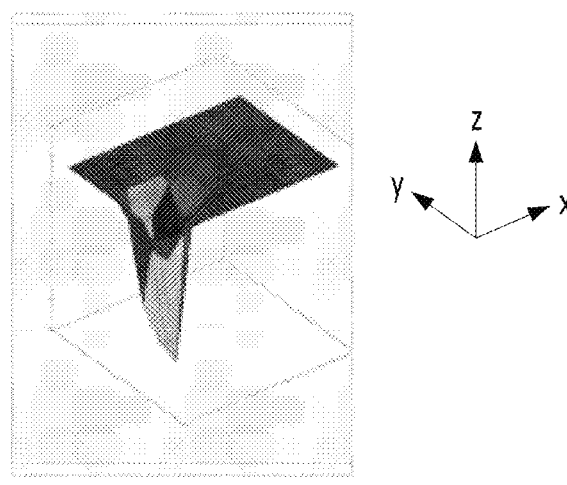
Figure 4A:
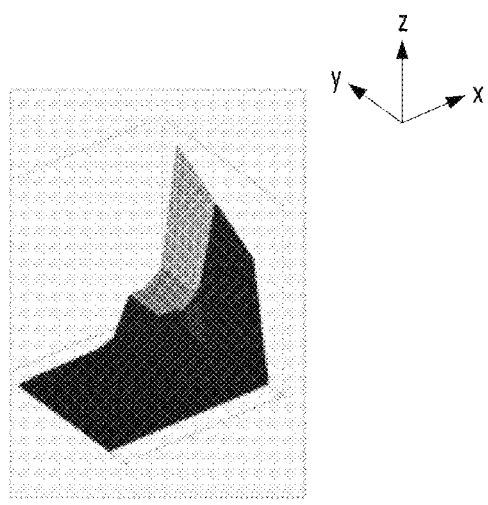
FIGS. 4A and 4B are diagrams for explaining step 55 shown in FIG. 2.
Figure 4B:
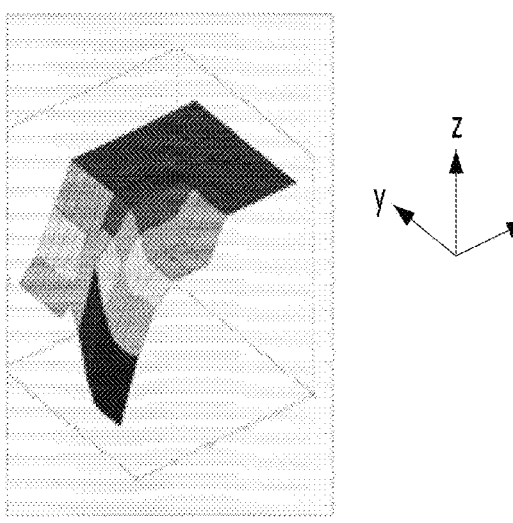
Figure 5A:
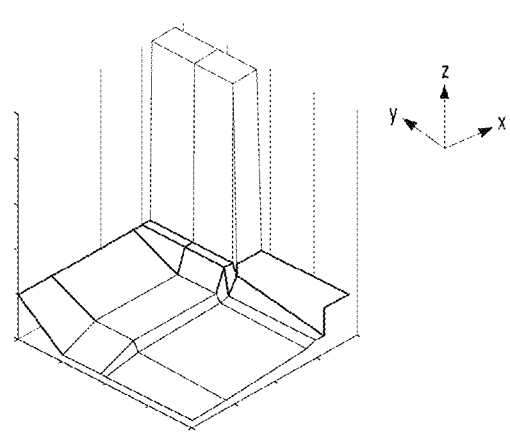
FIGS. 5A and 5B are diagrams for explaining step 59 shown in FIG. 2.
Figure 5B:
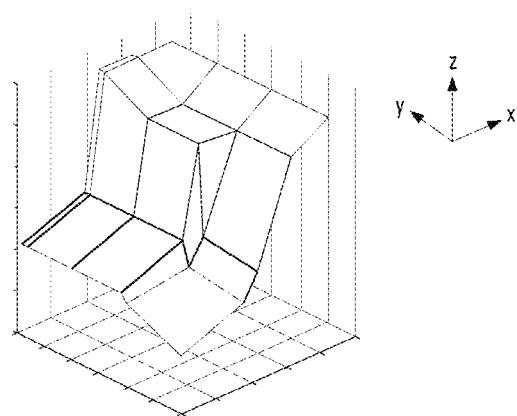

FIGS. 3A and 3B are diagrams for explaining step 51 shown in FIG. 2, FIGS. 4A and 4B are diagrams for explaining step 55 shown in FIG. 2, and FIGS. 5A and 5B are diagrams for explaining step 59 shown in FIG. 2. In each drawing, the x-axis and the y-axis represent coordinates, and the z-axis represents the values of tuning parameters.

In the point cloud acquired by the LiDAR sensor 12, the distance to an object and the point density are inversely proportional to each other. Therefore, tuning parameters need to be varied when a "group density-based clustering" method is performed according to the x-axis coordinates and the y-axis coordinates of "unit groups", which is described later with reference to FIG. 6-8, or when a "density-based clustering" method is performed according to the x-axis coordinates and the y-axis coordinates of "points", which is described later with reference to FIG. 13. In the "density-based clustering" or the "group density-based clustering", tuning parameters may be determined through a region of interest (ROI)-based two-dimensional (2D) look-up table (LUT), and may be accumulated and tuned based on traveling data (logging data), with priority given to prevention of incorrect operation (i.e. from the perspective of false-negative).

For example, incorrect operation occurrence data information, coordinates, threshold values of tuning parameters for preventing incorrect operation, and explanation of an incorrect operation occurrence situation may be recorded in an incorrect operation occurrence data accumulation table for tuning the ROI-based 2D look-up table.

The tuning from the perspective of false-negative (with priority given to prevention of incorrect operation) may be performed by combining an optimization method and a heuristic method.

According to an embodiment, the tuning parameters may be determined as follows.

First, the initial values of the tuning parameters are determined (step 51). For example, FIG. 3A shows the initial value of a first tuning parameter, and FIG. 3B shows the initial value of a second tuning parameter.

After step 51, a misrecognition (i.e. false recognition) situation of clustering is stored in a database (step 53). For example, "incorrect operation occurrence data information", "incorrect operation grid information", and "incorrect operation object ground truth (GT) information" may be recorded in respective databases. Examples of information that is recorded in each list in the database are as follows.

Information about a driving vehicle, a driving date, a driving sensor, and an incorrect operation occurrence frame may be recorded in the list of "incorrect operation occurrence data information". Information about the coordinates of each of "unit groups" and the attributes of "unit groups", which is described below with reference to FIG. 6, may be recorded in the list of "incorrect operation grid information". Information about the coordinates of each of GT unit groups and the attributes of GT unit groups may be recorded in the list of "incorrect operation object GT information".

After step 53, a tuning parameter for avoiding a misrecognition situation is detected in the database (step 55). For example, step 55 may be performed using a gradient descent (optimization) method. FIG. 4A shows the learning (optimization) value of the first parameter, and FIG. 4B shows the learning value of the second parameter.

After step 55, post-processing (e.g. a heuristic process) is performed on the found tuning parameter (step 57). Here, the post-processing may be an operation of interpolating a tuning parameter using a phenomenon in which the coordinates of a point are maximized for each of one or more tuning parameters detected in step 55. For example, simplification, normalization and scaling processes may be performed in step 57.

After step 57, the post-processed tuning parameter is determined (step 59). For example, the coordinates of the result of interpolation performed in step 57 may be obtained in step 59. FIG. 5A shows the determined value of the first parameter, and FIG. 5B shows the determined value of the second parameter.

Hereinafter, the "group density-based clustering" method according to the embodiment is described with reference to the accompanying drawings.

Figure 6:
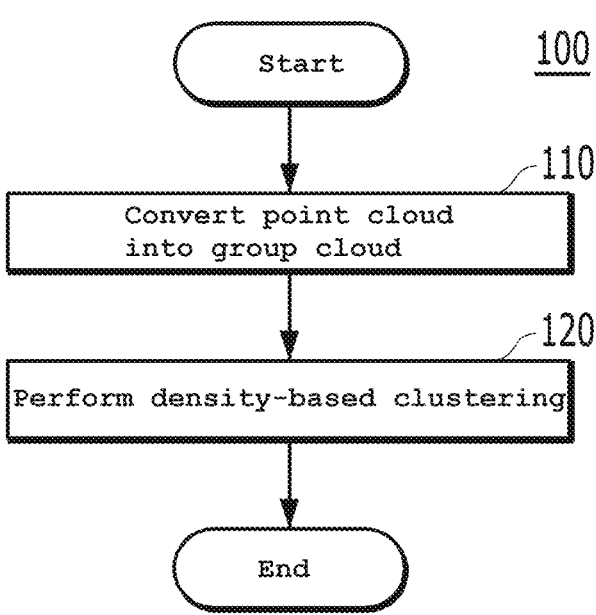
FIG. 6 is a flowchart of a "group density-based clustering" method according to an embodiment.

FIG. 6 is a flowchart of the "group density-based clustering" method 100 according to the embodiment.

Figure 7A:
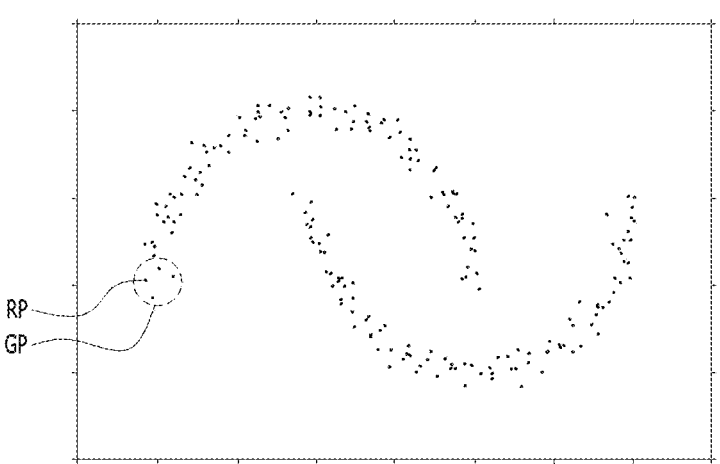
FIGS. 7A and 7B are diagrams to help understand the "group density-based clustering" method according to the embodiment shown in FIG. 6.
Figure 7B:
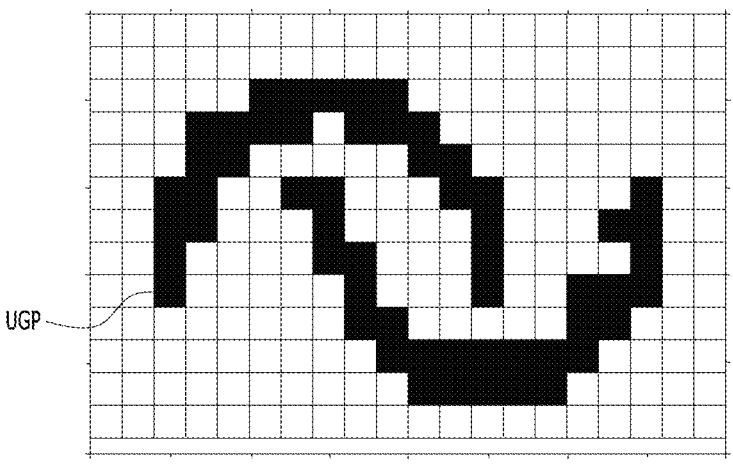

FIGS. 7A and 7B are diagrams to help understand the "group density-based clustering" method according to the embodiment shown in FIG. 6. In each of FIGS. 7A and 7B, the x-axis and the y-axis represent coordinates.

For better understanding, the method 100 shown in FIG. 6 is described as being performed by the clustering unit 16 shown in FIG. 1, but the embodiment is not limited thereto.

First, the point cloud shown in FIG. 7A, which is acquired from the object by the LiDAR sensor 12, is converted into a group cloud shown in FIG. 7B (step 110). Here, as "point cloud" refers to a plurality of points, "group cloud" may refer to a plurality of unit groups, which are described below.

In this case, each unit group of the group cloud is a "set of points that are present in unit space defined by a user". In addition, the coordinates of the unit group correspond to the average value of the coordinates of a plurality of points included in the corresponding set. For example, the unit group UGP shown in FIG. 7B may correspond to the group GP of the plurality of points shown in FIG. 7A, and the coordinates of the unit group UGP may correspond to the average value of the coordinates of the plurality of points GP shown in FIG. 7A. In other words, the x-axis coordinate of the unit group UGP shown in FIG. 7B may correspond to the average value of the x-axis coordinates of the plurality of points GP shown in FIG. 7A, and the y-axis coordinate of the unit group UGP shown in FIG. 7B may correspond to the average value of the y-axis coordinates of the plurality of points GP shown in FIG. 7A.

After step 110, the group cloud is clustered based on the density (step 120).

In the method shown in FIG. 6, step 120, but not step 110, corresponds to density-based clustering. However, as described below with reference to FIG. 13, density-based clustering is performed on a point basis, and group density-based clustering is performed on a unit group basis. In other words, the "density-based clustering" method shown in FIG. 13, which is described below, is performed to cluster a plurality of points, and the "group density-based clustering" method shown in FIG. 6 is performed to cluster a plurality of groups.

Figure 8:
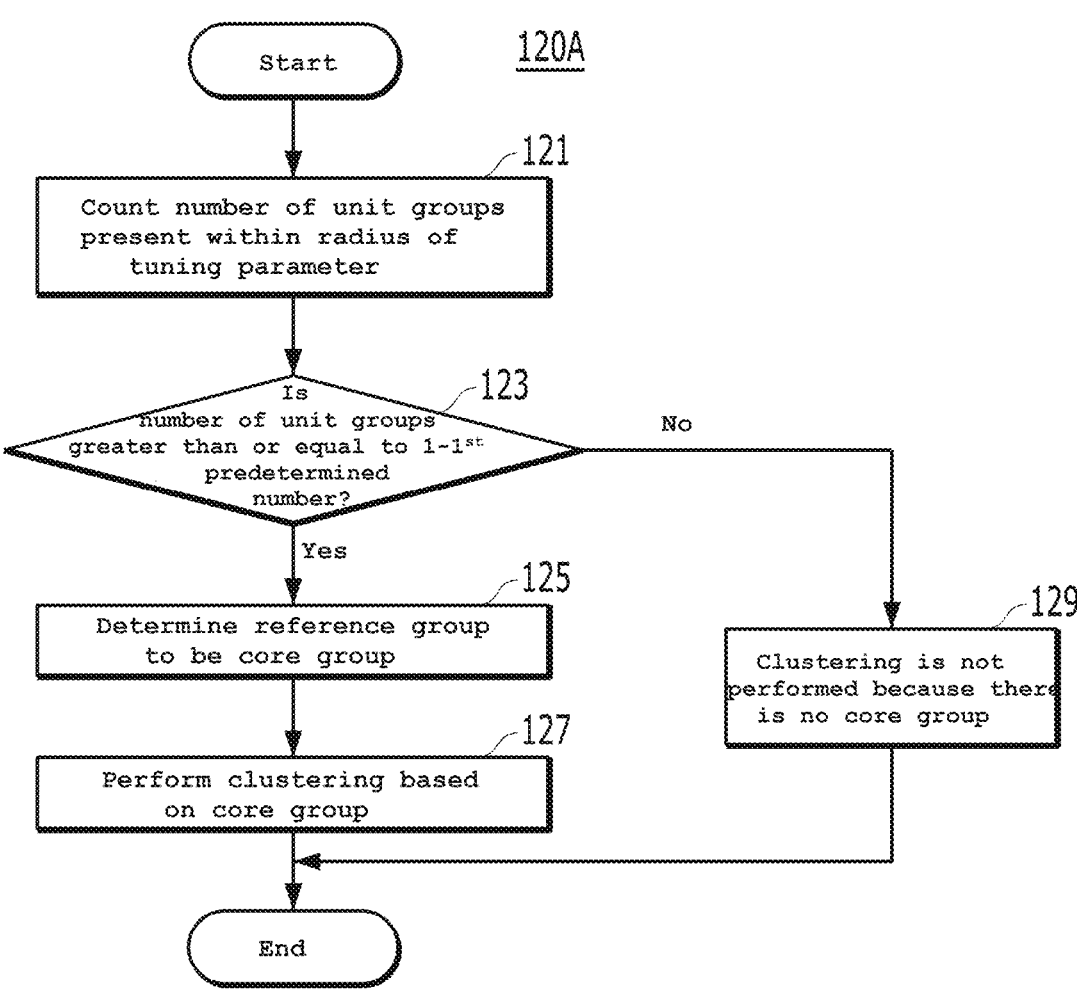
FIG. 8 is a flowchart of an embodiment of step 120 shown in FIG. 6.

FIG. 8 is a flowchart of an embodiment 120A of step 120 shown in FIG. 6.

Referring to FIG. 8, among a plurality of unit groups included in the group cloud, the number of unit groups present within the radius of a tuning parameter E based on a reference group (i.e. an origin point) is counted (step 121). For example, assuming that one UGP of the unit groups shown in FIG. 7B is set as a reference group, the number of unit groups present within the radius of the tuning parameter E based on the reference group UGP is counted. In this case, when the number of unit groups present within the radius of the tuning parameter E is counted, the reference group may not be counted.

The tuning parameter required to perform step 121 may be obtained through a 2D look-up table (LUT), which is configured by accumulating data in a false-negative manner.

In addition, as shown in FIG. 2, a tuning parameter E may be determined for each 2D region of interest (ROI) in consideration of a misrecognition situation of clustering, and step 121 may be performed using the determined tuning parameter E. The method of determining the tuning parameter E is the same as shown in FIG. 2. Table 1 below shows examples of parameters used to determine the tuning parameter E shown in FIG. 2.

TABLE 1

| Class. | Name of parameter | Unit | Value |
|---|---|---|---|
| 1 | min_x | m | Minimum value of x-coordinates of cluster that is subjected to density-based clustering |
| 2 | max_x | m | Maximum value of x-coordinates of cluster that is subjected to density-based clustering |
| 3 | min_y | m | Minimum value of y-coordinates of cluster that is subjected to density-based clustering |
| 4 | max_y | m | Maximum value of y-coordinates of cluster that is subjected to density-based clustering |
| 5 | longitudinal_length | m | Longitudinal length of cluster that is subjected to density-based clustering |

TABLE 1-continued

| Class. | Name of parameter | Unit | Value |
|--------|-------------------|------|-------|
| 6 | lateral_length | m | Lateral length of cluster that is subjected to density-based clustering |
| 7 | DENSITYBASED_E | — | Factor that searches unit group present within radius of tuning parameter |
| 8 | DENSITYBASED_n | — | Number that is reference of determination of core unit group |
| 9 | QUANTIZATION_x | m | x-size of unit group |
| 10 | QUANTIZATION_y | m | y-size of unit group |
| 11 | QUANTIZATION_z | m | z-size of unit group |

Here, parameter 7 (DENSITYBASED_E) corresponds to a tuning parameter used in step 121 of FIG. 8, parameter 8 (DENSITYBASED_n) corresponds to the $1\text{-}1^{st}$ predetermined number mentioned in step 123 of FIG. 8, and parameters 9 to 11 (QUANTIZATION_x, QUANTIZATION_y and QUANTIZATION_z) represent the x-axis, y-axis and z-axis sizes of each "unit group" included in the group cloud mentioned in step 110 of FIG. 6.

The "group density-based clustering" according to the above-described embodiment may be performed using a fixed tuning parameter, or may be performed using the tuning parameter, which varies as shown in FIG. 2.

After step 121, whether the number of counted unit groups is greater than or equal to the first predetermined number (hereinafter referred to as the "$1\text{-}1^{st}$ predetermined number") is checked (step 123).

If the number of counted unit groups is less than the $1\text{-}1^{st}$ predetermined number, clustering is not performed because there is no core group (step 129). However, if the number of counted unit groups is greater than or equal to the $1\text{-}1^{st}$ predetermined number, the reference group is determined to be a core group (step 125). In FIG. 7B, if the number of unit groups present within the radius of the tuning parameter based on the reference group UGP is greater than or equal to the $1\text{-}1^{st}$ predetermined number, the reference group UGP may be determined to be a core group.

After step 125, clustering is performed based on the determined core group (step 127).

In addition, according to the embodiment, after the coordinates of the points included in the unit group are stored, when a situation in which processing is required occurs at the subsequent point level, the coordinates of the points included in each of the stored unit groups may be used.

Hereinafter, the object-tracking apparatus 200 and the object-tracking method 300 using a LiDAR sensor according to the embodiment are described with reference to the accompanying drawings.

Figure 9:
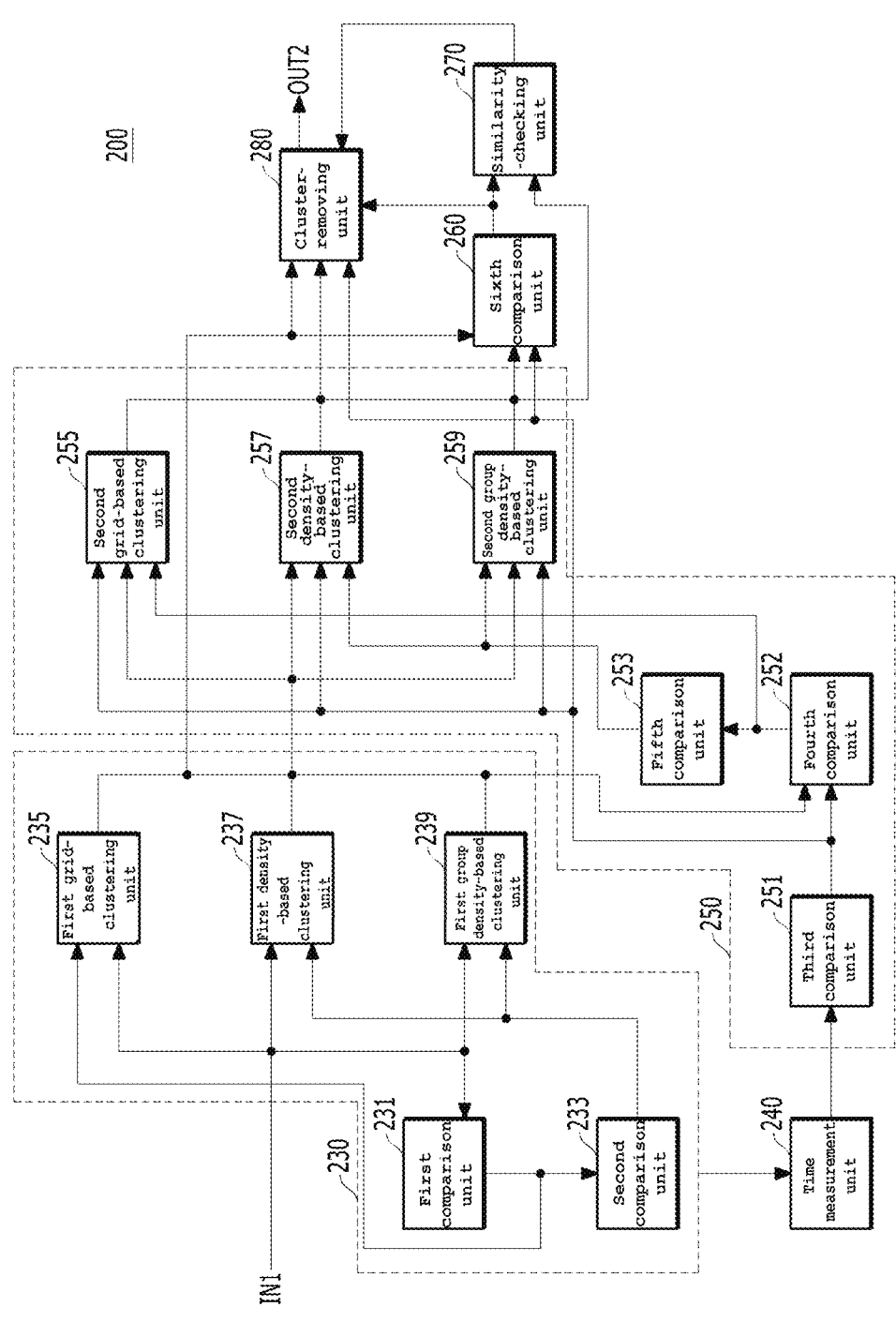
FIG. 9 is a block diagram of an embodiment of the clustering unit shown in FIG. 1.
Figure 10:
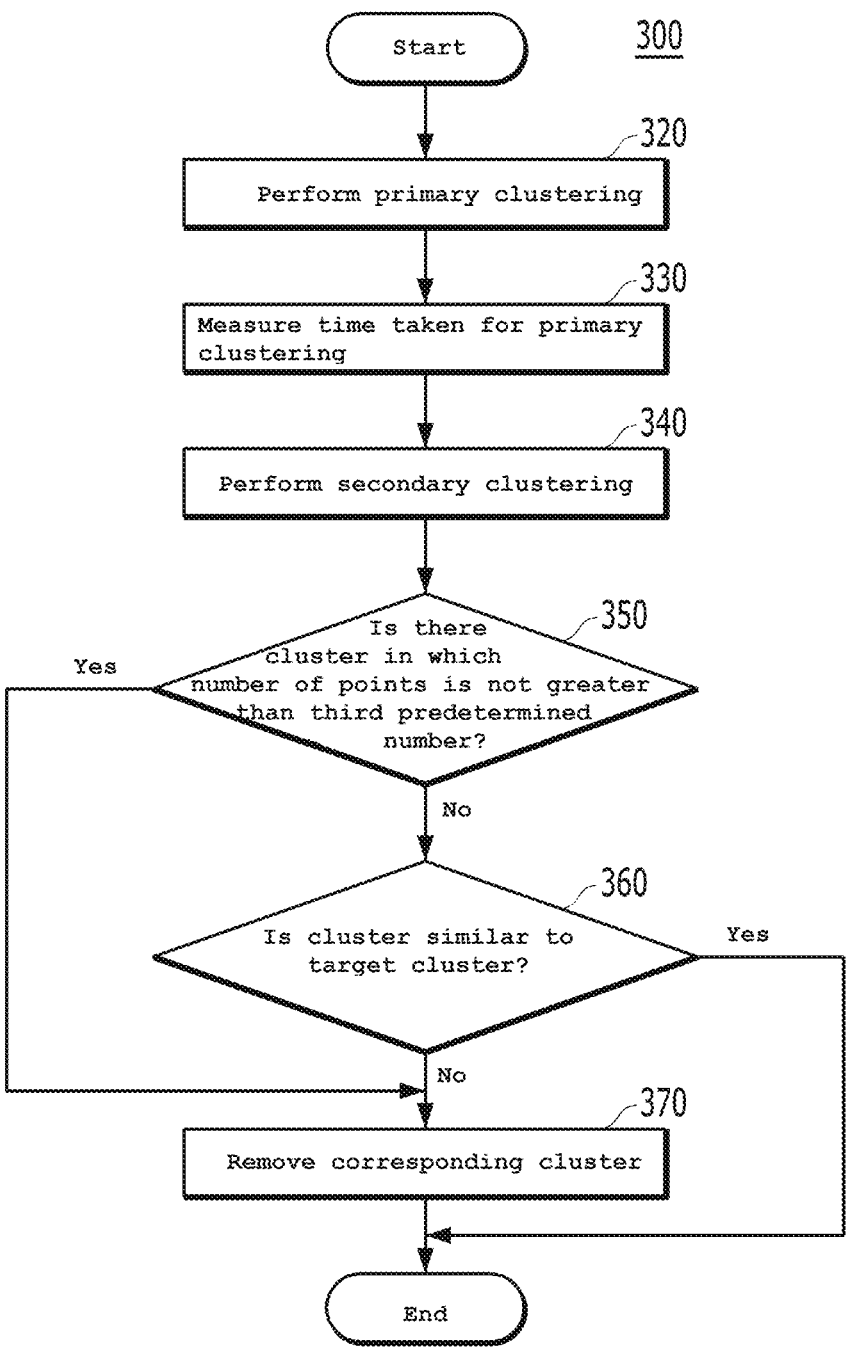
FIG. 10 is a flowchart of a clustering method according to an embodiment.

FIG. 9 is a block diagram of an embodiment 200 of the clustering unit 16 shown in FIG. 1, and FIG. 10 is a flowchart of the clustering method 300 according to the embodiment.

The clustering unit 200 shown in FIG. 9 is described as performing the clustering method 300 shown in FIG. 10, but the embodiment is not limited thereto. In other words, according to another embodiment, the clustering unit 200 shown in FIG. 9 may perform an object-tracking method configured differently from the clustering method 300 shown in FIG. 10, and the clustering method 300 shown in FIG. 10 may be performed by a clustering unit configured differently from the clustering unit 200 shown in FIG. 9.

The clustering unit 200 shown in FIG. 9 may include first and second clustering units 230 and 250 and a time measurement unit 240. In addition, the clustering unit 200 may further include at least one of a sixth comparison unit 260, a similarity-checking unit 270, or a cluster-removing unit 280.

The first clustering unit 230 receives the point cloud acquired by the LiDAR sensor 12 through an input terminal IN, and primarily clusters the point cloud (step 320).

FIGS. 11A-11D are diagrams to help understand the clustering unit 200 and the clustering method 300. FIG. 12 is a flowchart of an embodiment 320A of step 320 shown in FIG. 10.

The first clustering unit 230 shown in FIG. 9 is described as performing step 320A shown in FIG. 12, but the embodiment is not limited thereto. In other words, according to another embodiment, the first clustering unit 230 shown in FIG. 9 may perform step 320 configured differently from step 320A shown in FIG. 12, and step 320A shown in FIG. 12 may be performed by a first clustering unit configured differently from the first clustering unit 230 shown in FIG. 9.

The first clustering unit 230 shown in FIG. 9 may include first and second comparison units 231 and 233, a first grid-based clustering unit 235, a first density-based clustering unit 237, and a first group density-based clustering unit 239.

Referring to FIG. 12, whether the area A of the region of the point cloud is greater than a first threshold area TA1 is checked (step 321). For example, in order to perform step 321, the first comparison unit 231 may compare the area A of the region of the point cloud, received through the input terminal IN, with the first threshold area TA1, and may output the result of the comparison to the second comparison unit 233 and the first grid-based clustering unit 235.

If the area A of the region of the point cloud is greater than the first threshold area TA1, grid-based clustering is performed on the point cloud (step 323). For example, in order to perform step 323, when it is recognized that the area A of the region of the point cloud is greater than the first threshold area TA1 based on the result of comparison by the first comparison unit 231, the first grid-based clustering unit 235 may perform grid-based clustering on the point cloud. For example, clusters B1, B2 and B3 shown in FIG. 11B may be generated by performing cylindrical grid-based clustering in step 323. The white box shown in FIG. 11A indicates a grid.

However, if the area A of the region of the point cloud is not greater than the first threshold area TA1, whether the area A of the region of the point cloud is greater than a second threshold area TA2 is checked (step 325). Here, the second threshold area TA2 may be set to be smaller than the first threshold area TA1. For example, in order to perform step 325, when it is recognized that the area A of the region of the point cloud is not greater than the first threshold area TA1 based on the result of comparison by the first comparison unit 231, the second comparison unit 233 may compare the area A of the region of the point cloud with the second threshold area TA2. The second comparison unit 233 may also output the result of the comparison to the first density-based clustering unit 237 and the first group density-based clustering unit 239.

Each of the first and second threshold areas TA1 and TA2 may be determined in advance in consideration of the execution time and the target execution time according to the region of the point cloud.

If the area A of the region of the point cloud is greater than the second threshold area TA2, "density-based clustering" is performed on the points of the point cloud (step 327). For example, in order to perform step 327, when it is recognized that the area A of the region of the point cloud is greater than the second threshold area TA2 based on the result of comparison by the second comparison unit 233, the first density-based clustering unit 237 may perform density-based clustering on the points of the point cloud received through the input terminal IN.

Figure 12:
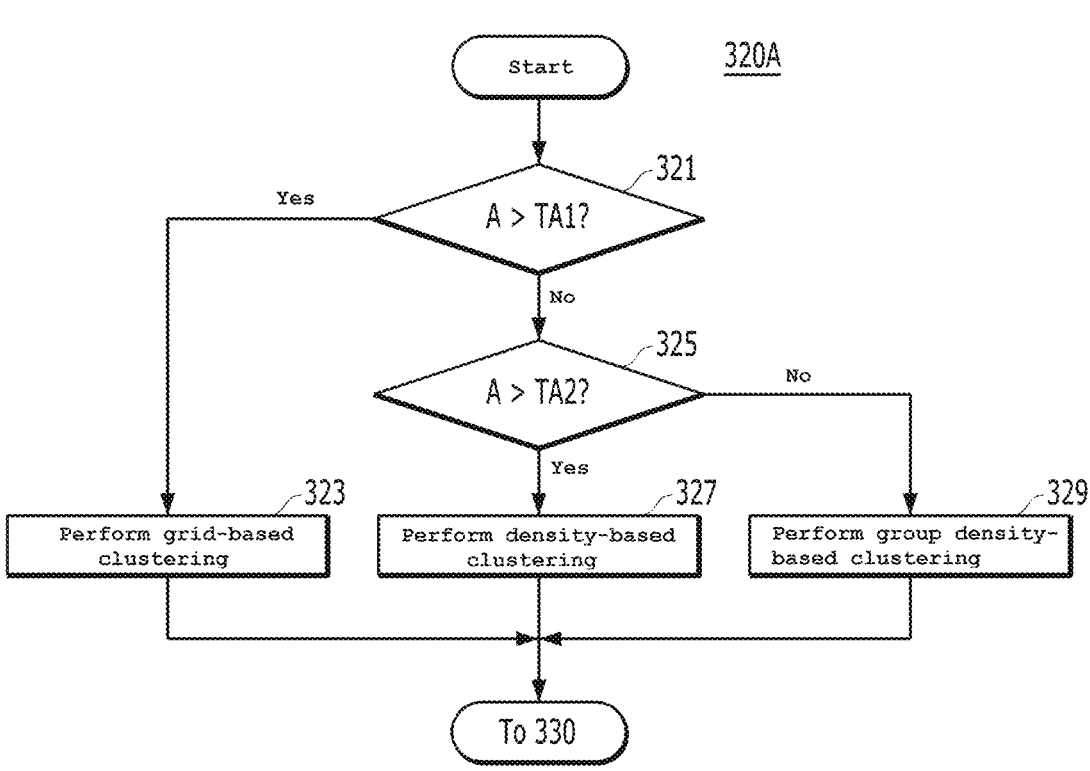
FIG. 12 is a flowchart of an embodiment of step 320 shown in FIG. 10.
Figure 13:
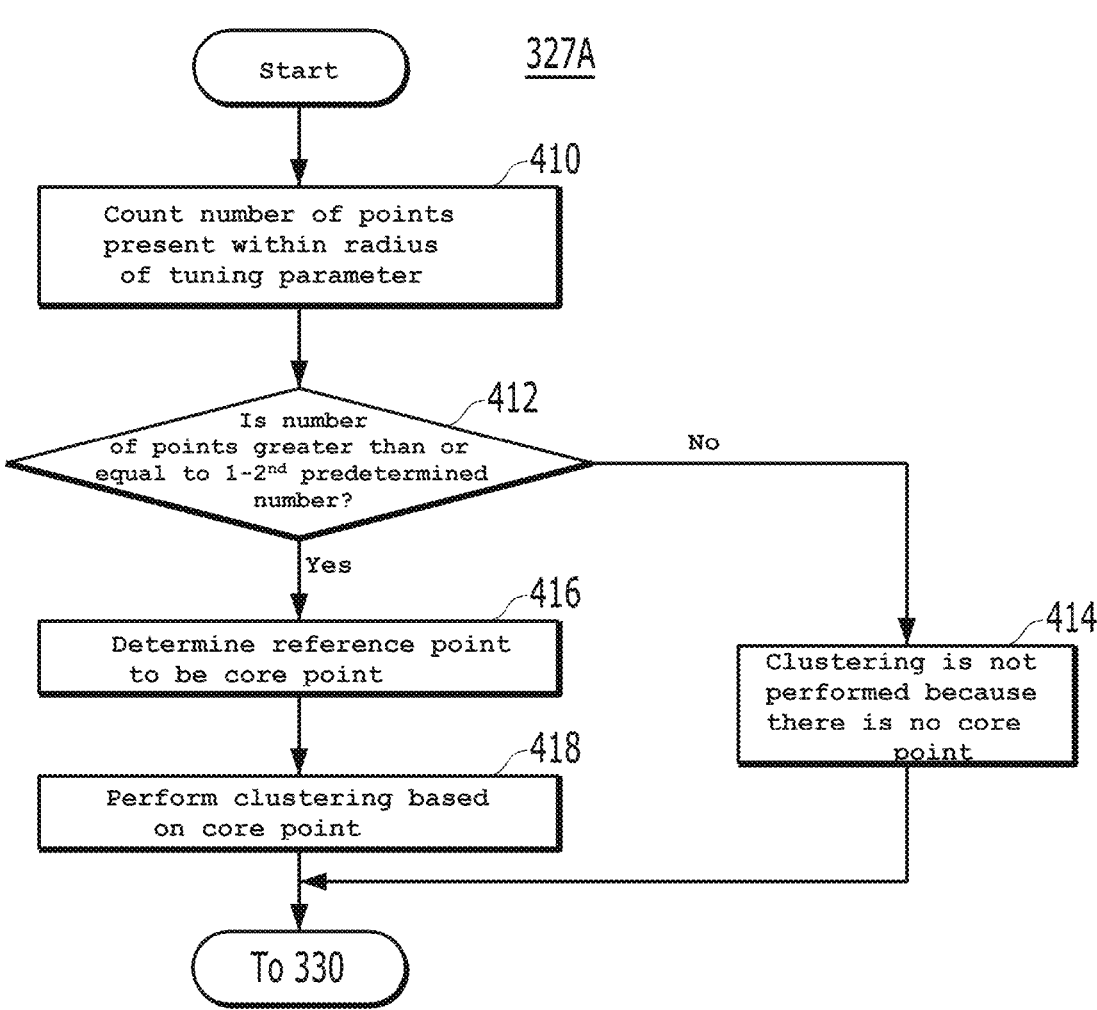
FIG. 13 is a flowchart of an embodiment of step 327 shown in FIG. 12.

FIG. 13 is a flowchart of an embodiment 327A of step 327 shown in FIG. 12. Specifically, FIG. 13 shows the process in which "density-based clustering" is performed.

Among a plurality of points included in the point cloud, the number of points present within the radius of the tuning parameter based on a reference point is counted (step 410). For example, assuming that one RP of the points shown in FIG. 7A is set as a reference point, the number of points present within the radius of the tuning parameter based on the reference point RP is counted.

For example, the tuning parameter required to perform step 410 may be a fixed value, or may be a variable value, as shown in FIG. 2. The above explanation of the tuning parameter described in step 121 of FIG. 8 may apply to the tuning parameter for step 410.

After step 410, whether the number of counted points is greater than or equal to the first predetermined number (hereinafter referred to as the "1-2$^{nd}$ predetermined number") is checked (step 412).

If the number of counted points is less than the 1-2$^{nd}$ predetermined number, clustering is not performed because there is no core point (step 414). However, if the number of counted points is greater than or equal to the 1-2$^{nd}$ predetermined number, the reference point is determined to be a core point (step 416). In FIG. 7A, if the number of points present within the radius of the tuning parameter based on the reference point RP is greater than or equal to the 1-2$^{nd}$ predetermined number, the reference point RP may be determined to be a core point.

After step 416, clustering is performed based on the determined core point (step 418).

Referring again to FIG. 12, if the area A of the region of the point cloud is not greater than the second threshold area TA2, "group density-based clustering" is performed on the points of the point cloud (step 329). For example, in order to perform step 329, the first group density-based clustering unit 239 operates in response to the result of comparison by the second comparison unit 233. Specifically, the first group density-based clustering unit 239 performs group density-based clustering on the points of the point cloud when it is recognized that the area A of the region of the point cloud is not greater than the second threshold area TA2 based on the result of comparison by the second comparison unit 233. For example, since the group density-based clustering may correspond to step 100 shown in FIG. 6, a duplicate description thereof has been omitted.

Figure 11A:
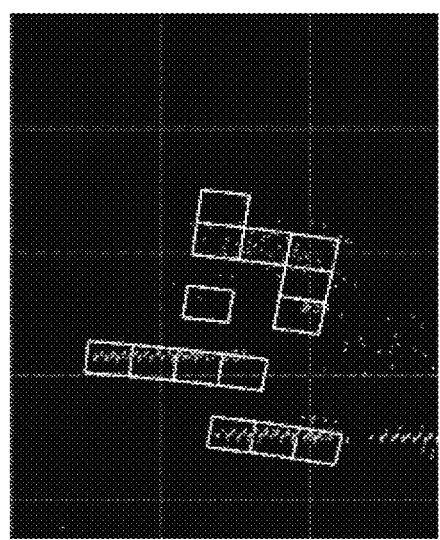
FIGS. 11A-11D are diagrams to help understand the clustering unit and the clustering method.
Figure 11B:

As described above, when the point cloud is primarily clustered in step 320 shown in FIG. 10, the clusters B1, B2 and B3 shown in FIG. 11B may be obtained.

Referring again to FIG. 10, after step 320, depending on the time taken for primary clustering, i.e. the time taken to perform step 320, the result of primary clustering may be secondarily clustered (steps 330 and 340).

In detail, the time taken to perform the primary clustering step is measured (step 330). In other words, the time taken to perform step 320 is measured. For example, the time measurement unit 240 may measure the time taken for the first clustering unit 230 to perform primary clustering and may output the result of the measurement to the second clustering unit 250.

The second clustering unit 250 secondarily clusters the result of primary clustering depending on the time taken to perform primary clustering, i.e. in response to the time taken to perform primary clustering (step 340).

Figure 14:
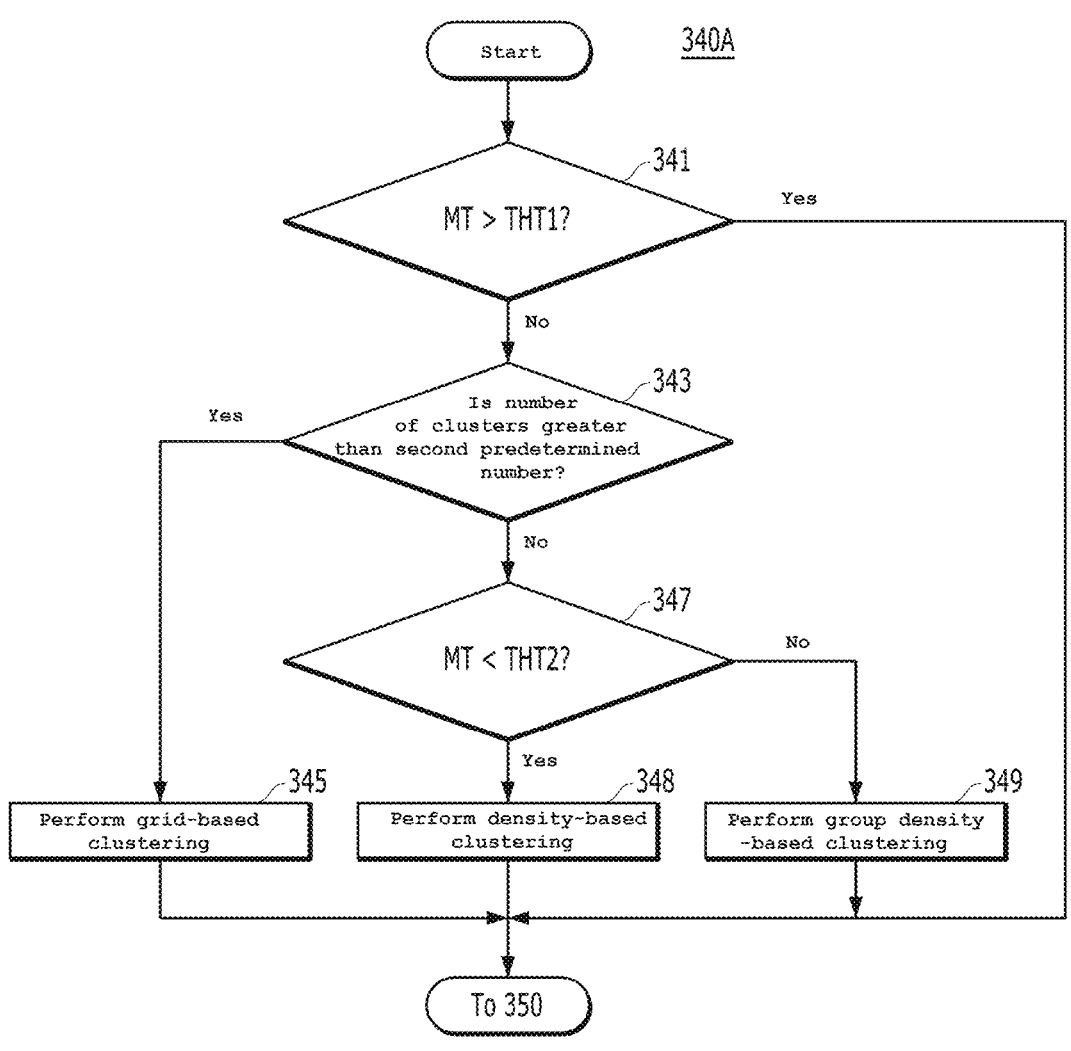
FIG. 14 is a flowchart of an embodiment of step 340 shown in FIG. 10.

FIG. 14 is a flowchart of an embodiment 340A of step 340 shown in FIG. 10.

The second clustering unit 250 shown in FIG. 9 is described as performing step 340A shown in FIG. 14, but the embodiment is not limited thereto. In other words, according to another embodiment, the second clustering unit 250 shown in FIG. 9 may perform step 340 configured differently from step 340A shown in FIG. 14, and step 340A shown in FIG. 14 may be performed by a second clustering unit configured differently from the second clustering unit 250 shown in FIG. 9.

The second clustering unit 250 shown in FIG. 9 may include third to fifth comparison units 251, 252 and 253, a second grid-based clustering unit 255, a second density-based clustering unit 257, and a second group density-based clustering unit 259.

After step 330, whether the time taken to perform step 320 is greater than a first threshold time THT1 is checked (step 341). For example, in order to perform step 341, the third comparison unit 251 may compare the time measured by the time measurement unit 240 with the first threshold time THT1, and may output the result of the comparison to at least one of the fourth comparison unit 252, the second grid-based clustering unit 255, the second density-based clustering unit 257, the second group density-based clustering unit 259, or the cluster-removing unit 280.

If the time taken to perform step 320 is greater than the first threshold time THT1, the second clustering steps 345, 348 and 349 are not performed.

According to an embodiment, each of the second grid-based clustering unit 255, the second density-based clustering unit 257, and the second group density-based clustering unit 259 may not operate in response to the result of comparison by the third comparison unit 251.

The results of clustering by the first grid-based clustering unit 235, the first density-based clustering unit 237, and the first group density-based clustering unit 239 may be output to the second grid-based clustering unit 255, the second density-based clustering unit 257, and the second group density-based clustering unit 259, respectively. In addition, the result of clustering by the first grid-based clustering unit 235, the first density-based clustering unit 237, or the first group density-based clustering unit 239 may also be output to the cluster-removing unit 280, as described above.

According to another embodiment, when it is recognized that the time taken to perform step 320 is greater than the first threshold time THT1 based on the result of comparison by the third comparison unit 251, the cluster-removing unit 280 may receive the result of clustering by the first clustering unit 230, rather than receiving the result of clustering by the second clustering unit 250.

However, when the time taken to perform primary clustering is not greater than the first threshold time THT1, whether the number of clusters obtained in the primary clustering step is greater than a second predetermined number is checked (step 343). The clusters, the number of which is compared with the second predetermined number in step 343, may be all of the clusters obtained by the first clustering unit 230, or may be target clusters, which are some of the clusters obtained by the first clustering unit 230. Here, the target clusters may be clusters related to the object, which are required to undergo secondary clustering, among the clusters obtained by performing primary clustering.

For example, in order to perform step 343, the fourth comparison unit 252 operates in response to the result of comparison by the third comparison unit 251. Specifically, when it is recognized that the time taken to perform primary clustering is not greater than the first threshold time THT1 based on the result of comparison by the third comparison unit 251, the fourth comparison unit 252 may compare the number of clusters (or target clusters) obtained by the first clustering unit 230 with the second predetermined number, and may output the result of the comparison to the fifth comparison unit 253 and the second grid-based clustering unit 255. To this end, the fourth comparison unit 252 may receive the result of clustering by the first grid-based clustering unit 235, the first density-based clustering unit 237, or the first group density-based clustering unit 239, may count the number of clusters (or target clusters) clustered by the respective clustering units 235, 237 and 239, and may compare the result of the counting with the second predetermined number.

If the number of counted clusters (or target clusters) is greater than the second predetermined number, grid-based clustering is performed on the primarily clustered points (step 345). For example, in order to perform step 345, the second grid-based clustering unit 255 operates in response to the result of comparison by the fourth comparison unit 252. Specifically, the second grid-based clustering unit 255 performs grid-based clustering on the clusters (or points) clustered by the first clustering unit 230 when it is recognized that the number of counted clusters (or target clusters) is greater than the second predetermined number based on the result of comparison by the fourth comparison unit 252.

In the grid-based clustering, which is performed in step 345, the size of the grid may be set again so as to be proportional to the size of the cluster.

The target to be clustered by each of the first grid-based clustering unit 235, the first density-based clustering unit 237, and the first group density-based clustering unit 239 is a point cloud, and the target to be clustered by each of the second grid-based clustering unit 255, the second density-based clustering unit 257, and the second group density-based clustering unit 259 is a cluster (or a clustered point), which is formed by primary clustering. Except for this, the second grid-based clustering unit 255, the second density-based clustering unit 257, and the second group density-based clustering unit 259 perform the same operations as the first grid-based clustering unit 235, the first density-based clustering unit 237, and the first group density-based clustering unit 239, respectively, and thus a duplicate description thereof has been omitted.

If the number of clusters (or target clusters) is not greater than the second predetermined number, whether the time taken to perform primary clustering, i.e. the time taken to perform step 320, is less than a second threshold time THT2 is checked (step 347). For example, in order to perform step 347, the fifth comparison unit 253 operates in response to the result of comparison by the fourth comparison unit 252. Specifically, when it is recognized that the number of clusters (or target clusters) is not greater than the second predetermined number based on the result of comparison by the fourth comparison unit 252, the fifth comparison unit 253 compares the time taken to perform primary clustering with the second threshold time THT2, and outputs the result of the comparison to the second density-based clustering unit 257 and the second group density-based clustering unit 259.

If the time taken to perform primary clustering is less than the second threshold time THT2, density-based clustering is performed on the primarily clustered points (or clusters) (step 348). For example, in order to perform step 348, the second density-based clustering unit 257 operates in response to the result of comparison by the fifth comparison unit 253. Specifically, the second density-based clustering unit 257 performs density-based clustering on the points (or clusters) clustered by the first clustering unit 230 when it is recognized that the time taken to perform primary clustering is less than the second threshold time THT2 based on the result of comparison by the fifth comparison unit 253.

However, if the time taken to perform primary clustering is not less than the second threshold time THT2, group density-based clustering is performed on the primarily clustered points (or clusters) (step 349). For example, in order to perform step 349, the second group density-based clustering unit 259 operates in response to the result of comparison by the fifth comparison unit 253. Specifically, the second group density-based clustering unit 259 performs group density-based clustering on the points (or clusters) clustered by the first clustering unit 230 when it is recognized that the time taken to perform primary clustering is not less than the second threshold time THT2 based on the result of comparison by the fifth comparison unit 253.

Figure 11C:
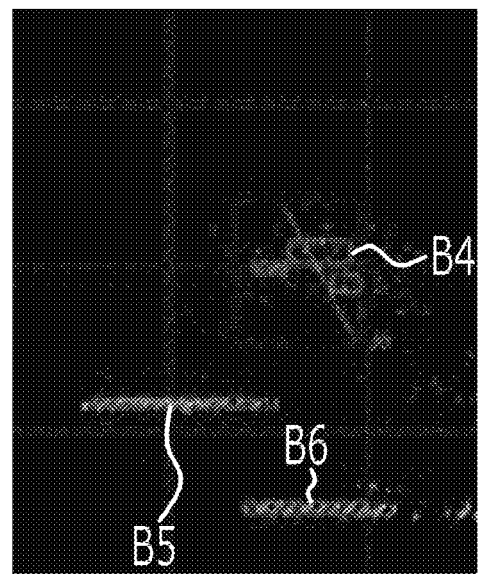

For example, when secondary clustering is performed on the result of primary clustering, the cluster B1 shown in FIG. 11B, which is formed by performing primary clustering, may be changed to the cluster B4 shown in FIG. 11C, the cluster B2 shown in FIG. 11B may be changed to the cluster B5 shown in FIG. 11C, and the cluster B3 shown in FIG. 11B may be changed to the cluster B6 shown in FIG. 11C.

Referring again to FIG. 10, after step 340, whether there is a cluster in which the number of points is not greater than a third predetermined number among the primarily or secondarily clustered clusters is checked (step 350). Here, the third predetermined number is a heuristic value.

In the case in which only primary clustering is performed and secondary clustering is not performed, step 350 may be performed only on the clusters formed by primary clustering. In the case in which both primary clustering and secondary clustering are performed, step 350 may be performed on the clusters formed by secondary clustering. For example, in order to perform step 350, the sixth comparison unit 260 compares the number of points included in each of the clusters clustered by the first or second clustering unit 230 or 250 with the third predetermined number, and outputs the result of the comparison to the cluster-removing unit 280 and the similarity-checking unit 270.

For example, based on the result of comparison by the third comparison unit 251, when it is recognized that the time measured by the time measurement unit 240 is greater than the first threshold time THT1 and thus secondary clustering is not performed, the sixth comparison unit 260 compares the number of points included in each of the clusters clustered by the first clustering unit 230 with the third predetermined number. However, based on the result of comparison by the third comparison unit 251, when it is recognized that the time measured by the time measurement unit 240 is not greater than the first threshold time THT1 and thus secondary clustering is performed, the sixth comparison unit 260 compares the number of points included in each of the clusters clustered by the second clustering unit 250 with the third predetermined number.

If there is no cluster in which the number of points is not greater than the third predetermined number among the primarily or secondarily clustered clusters, whether the similarity between a cluster in which the number of points is greater than the third predetermined number and the target cluster is outside of a predetermined range is checked (step 360). For example, in order to perform step 360, the similarity-checking unit 270 checks the similarity between a cluster in which the number of points is greater than the third predetermined number among the primarily or secondarily clustered clusters and the target cluster, and outputs the result of the checking to the cluster-removing unit 280.

For example, in the case in which the object is a sign, the width thereof is much greater than the length thereof. Thus, since the case in which the length of the cluster is similar to or greater than the width thereof corresponds to the case in which the similarity between this cluster and the target cluster is outside of a predetermined range, this cluster may be removed.

Among the primarily or secondarily clustered clusters, a cluster in which the number of points is not greater than the third predetermined number is removed. In addition, among the primarily or secondarily clustered clusters, a cluster in which the number of points is greater than the third predetermined number and the similarity with the target cluster is outside of a predetermined range is also removed (step 370). For example, in order to perform step 370, the cluster-removing unit 280 operates in response to the result of comparison by the sixth comparison unit 260. Specifically, the cluster-removing unit 280 removes a cluster in which the number of points is not greater than the third predetermined number based on the result of comparison by the sixth comparison unit 260. In addition, based on the result of checking by the similarity-checking unit 270, the cluster-removing unit 280 removes a cluster in which the number of points is greater than the third predetermined number and the similarity with the target cluster is outside of a predetermined range. Thereafter, the cluster-removing unit 280 may output unremoved clusters through an output terminal OUT2.

Figure 11D:
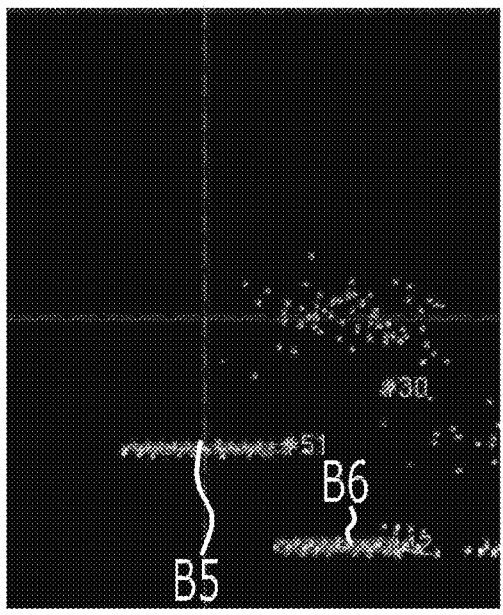

For example, among the clusters B4, B5 and B6 shown in FIG. 11C, the cluster B4 is removed in step 370 shown in FIG. 10, whereby the clusters B5 and B6 shown in FIG. 11D may be output as a final result through the output terminal OUT2.

FIGS. 11A-11D show the case in which an object of interest is a sign. When a sign is scanned by the LiDAR sensor 12, the result of the scanning may vary depending on the specifications of the LiDAR sensor 12. In many cases, because a sign is detected at a long distance, it is required to use a point cloud detected in a wide region. Therefore, in the primary clustering process, grid-based clustering (step 323) is performed to generate the clusters B1, B2 and B3 shown in FIG. 11B. In order to improve the accuracy of recognition (width, length, etc.) of an object of interest, secondary clustering is performed to generate the clusters B4, B5 and B6 shown in FIG. 11C. Subsequently, the cluster B4 shown in FIG. 11C, which is related to an object that lacks similarity to the characteristics of the object of interest, is removed, and then the final clusters B5 and B6 shown in FIG. 11D are output.

The clusters B1, B2 and B3 and the clusters B4, B5 and B6 shown in FIGS. 11B and 11C are related not only to a sign but also to a tree. However, it can be seen that the tree disappears and only the sign is output through the secondary clustering process.

Compared to when clustering is performed on the points shown in FIG. 7A through the "density-based clustering" method shown in FIG. 13, the time taken for clustering may be shortened when clustering is performed on the plurality of unit groups shown in FIG. 7B through the "group density-based clustering" method shown in FIG. 6.

In general, among clustering methods, a density-based clustering method takes less time for clustering and has higher recognition accuracy than a grid-based clustering method. Considering this, according to the object-tracking method and apparatus of the above-described embodiments, clustering is performed multiple times within a limited execution time. Specifically, based on a comprehensive determination of a region to be recognized, a target object, and recognition accuracy required in each of primary clustering and secondary clustering, a clustering method suitable for a situation, among the grid-based clustering method, the density-based clustering method, and the group density-based clustering method, is performed. Therefore, clustering performance within a limited time may be maximized, and thus the recognition performance of LiDAR may be improved.

As is apparent from the above description, in the tuning parameter determination method for tracking an object, the group density-based clustering method, the object-tracking method, and the object-tracking apparatus using a LiDAR sensor according to the embodiments, it is possible to shorten the time taken for clustering by performing clustering on a plurality of unit groups through the "group density-based clustering" method, compared to the case of performing clustering through the "density-based clustering" method. In addition, clustering is performed multiple times within a limited execution time such that a clustering method suitable for a situation, among the grid-based clustering method, the density-based clustering method, and the group density-based clustering method, is performed based on a comprehensive determination of a region to be recognized, a target object, and recognition accuracy required in each of primary clustering and secondary clustering. For these reasons, it is possible to maximize clustering performance within a limited time, and thus improve the recognition performance of LiDAR.

However, the effects achievable through the disclosure are not limited to the above-mentioned effects, and other effects not mentioned herein should be clearly understood by those having ordinary skill in the art from the above description.

The above-described various embodiments may be combined with each other without departing from the objects of the present disclosure unless they are incompatible with each other.

In addition, for any element or process that is not described in detail in any of the various embodiments, reference may be made to the description of an element or a process having the same reference numeral in another embodiment unless otherwise specified.

While the present disclosure has been particularly shown and described with reference to specific embodiments thereof, these embodiments are only proposed for illustrative purposes and do not restrict the present disclosure. It should be apparent to those having ordinary skill in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. An object-tracking method using a LiDAR sensor, the object-tracking method comprising:
    acquiring a point cloud related to an object;
    performing primary clustering on the point cloud; and
    performing secondary clustering on a result of the primary clustering depending on a time taken to perform the primary clustering, wherein performing the primary clustering comprises:

performing grid-based clustering on the point cloud when an area of a region of the point cloud is greater than a first threshold area;

checking whether the area of the region of the point cloud is greater than a second threshold area that is less than the first threshold area when the area of the region of the point cloud is not greater than the first threshold area;

performing density-based clustering on points of the point cloud when the area of the region of the point cloud is greater than the second threshold area; and performing group density-based clustering on the points of the point cloud when the area of the region of the point cloud is not greater than the second threshold area.

2. The object-tracking method according to claim 1, further comprising:

measuring a time taken for the primary clustering, wherein the secondary clustering is performed depending on the measured time.

3. The object-tracking method according to claim 2, wherein the performing the secondary clustering comprises:

checking whether the measured time is greater than a first threshold time;

checking whether the number of target clusters obtained during the primary clustering is greater than a second predetermined number when the measured time is not greater than the first threshold time;

performing the grid-based clustering on the points that have undergone the primary clustering when the number of the target clusters is greater than the second predetermined number;

checking whether the measured time is less than a second threshold time when the number of the target clusters is not greater than the second predetermined number;

performing the density-based clustering on the points that have undergone the primary clustering when the measured time is less than the second threshold time; and performing the group density-based clustering on the points that have undergone the primary clustering when the measured time is not less than the second threshold time.

4. The object-tracking method according to claim 1, further comprising:

checking whether there is a cluster in which the number of points is not greater than a third predetermined number among clusters that have undergone the primary clustering or the secondary clustering; and removing a cluster in which the number of points is not greater than the third predetermined number among the clusters that have undergone the primary clustering or the secondary clustering, and removing a cluster in which the number of points is greater than the third predetermined number and in which a similarity with a target cluster is outside of a predetermined range, among the clusters that have undergone the primary clustering or the secondary clustering.

5. An object-tracking apparatus comprising:

a LiDAR sensor configured to acquire a point cloud related to an object;

a first clustering unit configured to primarily cluster the point cloud; and a second clustering unit configured to secondarily cluster a result of primary clustering in response to a time taken to perform the primary clustering, wherein the first clustering unit comprises:

a first comparison unit configured to compare an area of a region of the point cloud with a first threshold area;

a first grid-based clustering unit configured to perform grid-based clustering on the point cloud in response to a result of comparison by the first comparison unit;

a second comparison unit configured to compare the area of the region of the point cloud with a second threshold area that is less than the first threshold area in response to the result of comparison by the first comparison unit;

a first density-based clustering unit configured to perform density-based clustering on points of the point cloud in response to a result of comparison by the second comparison unit; and a first group density-based clustering unit configured to perform group density-based clustering on the points of the point cloud in response to the result of comparison by the second comparison unit.

6. The object-tracking apparatus according to claim 5, further comprising:

a time measurement unit configured to measure the time taken to primarily cluster the point cloud.

7. The object-tracking apparatus according to claim 6, wherein the second clustering unit comprises:

a third comparison unit configured to compare the measured time with a first threshold time;

a fourth comparison unit configured to compare the number of target clusters obtained by the first clustering unit with a second predetermined number in response to a result of comparison by the third comparison unit;

a second grid-based clustering unit configured to perform grid-based clustering on the points clustered by the first clustering unit in response to a result of comparison by the fourth comparison unit;

a fifth comparison unit configured to compare the measured time with a second threshold time in response to the result of comparison by the fourth comparison unit;

a second density-based clustering unit configured to perform the density-based clustering on the points clustered by the first clustering unit in response to a result of comparison by the fifth comparison unit; and a second group density-based clustering unit configured to perform the group density-based clustering on the points clustered by the first clustering unit in response to the result of comparison by the fifth comparison unit.

8. The object-tracking apparatus according to claim 5, further comprising:

a sixth comparison unit configured to compare the number of points included in each of clusters clustered by the first clustering unit or the second clustering unit with a third predetermined number;

a similarity-checking unit configured to check similarity between a cluster, in which the number of points is greater than the third predetermined number among the primarily or secondarily clustered clusters, and a target cluster; and a cluster-removing unit configured to remove a cluster in which the similarity is outside of a predetermined range or a cluster in which the number of points is not greater than the third predetermined number, in response to a result of comparison by the sixth comparison unit or a result of checking by the similarity-checking unit.

* * * * *